United States Patent Office 2,744,609
Patented May 8, 1956

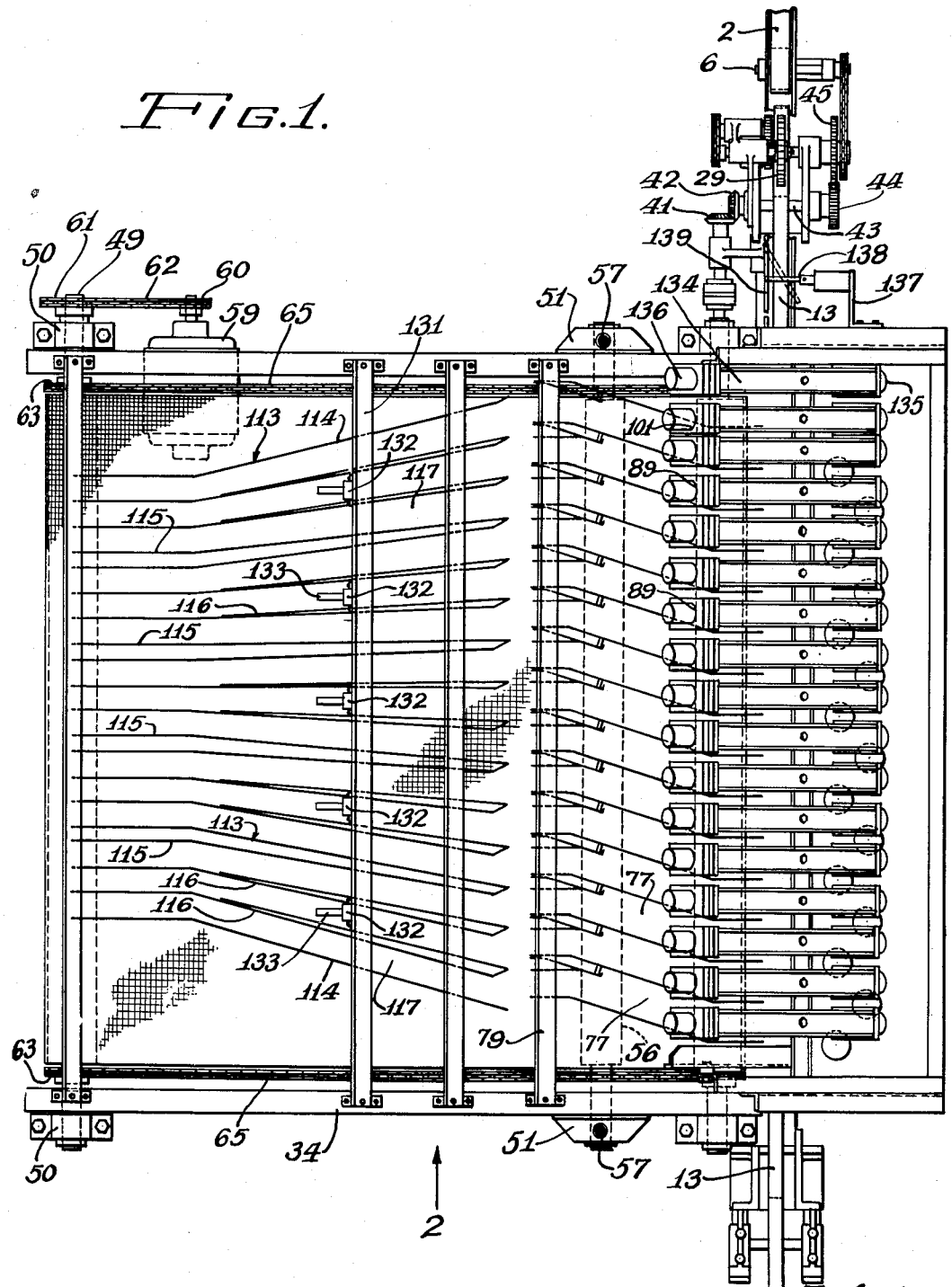

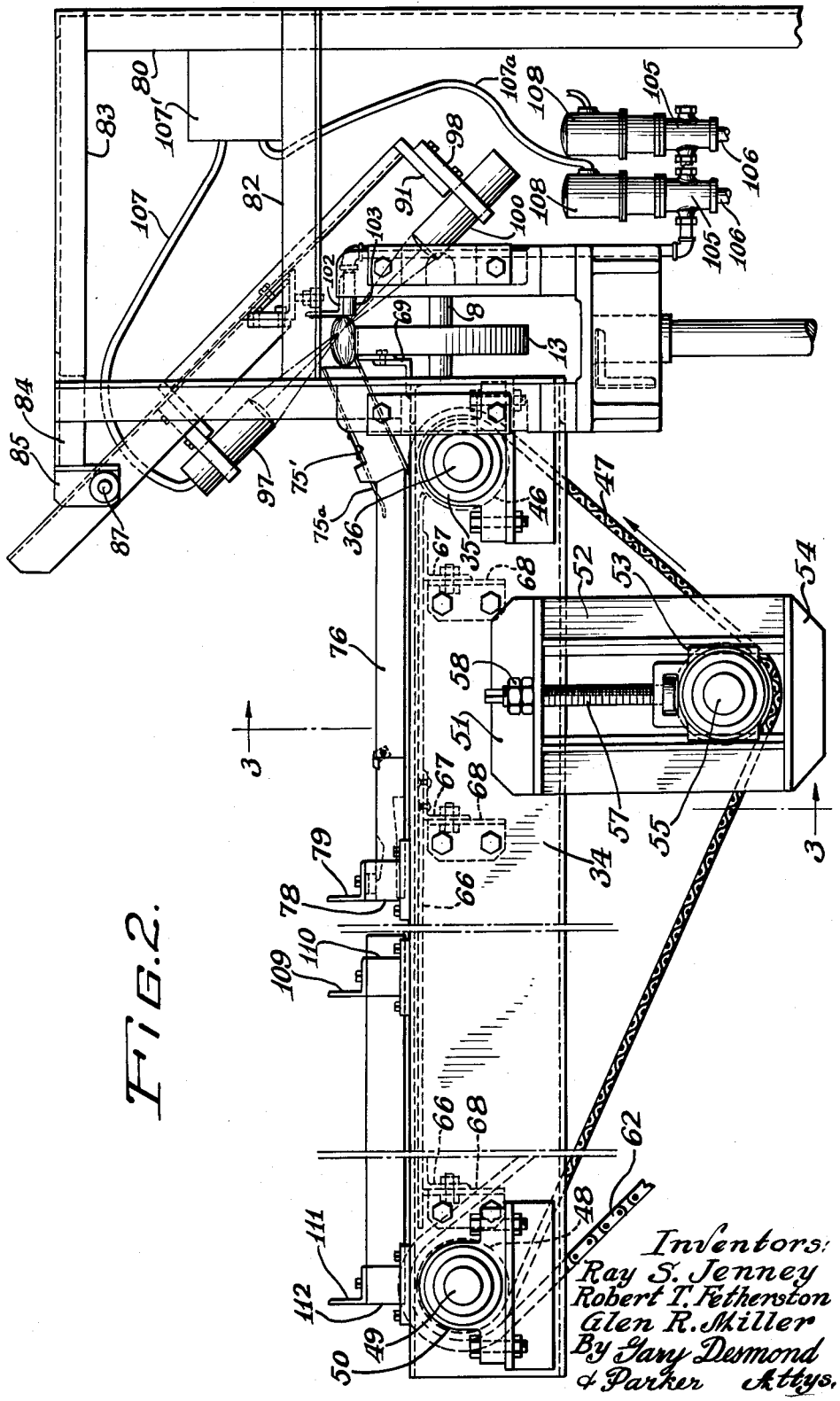

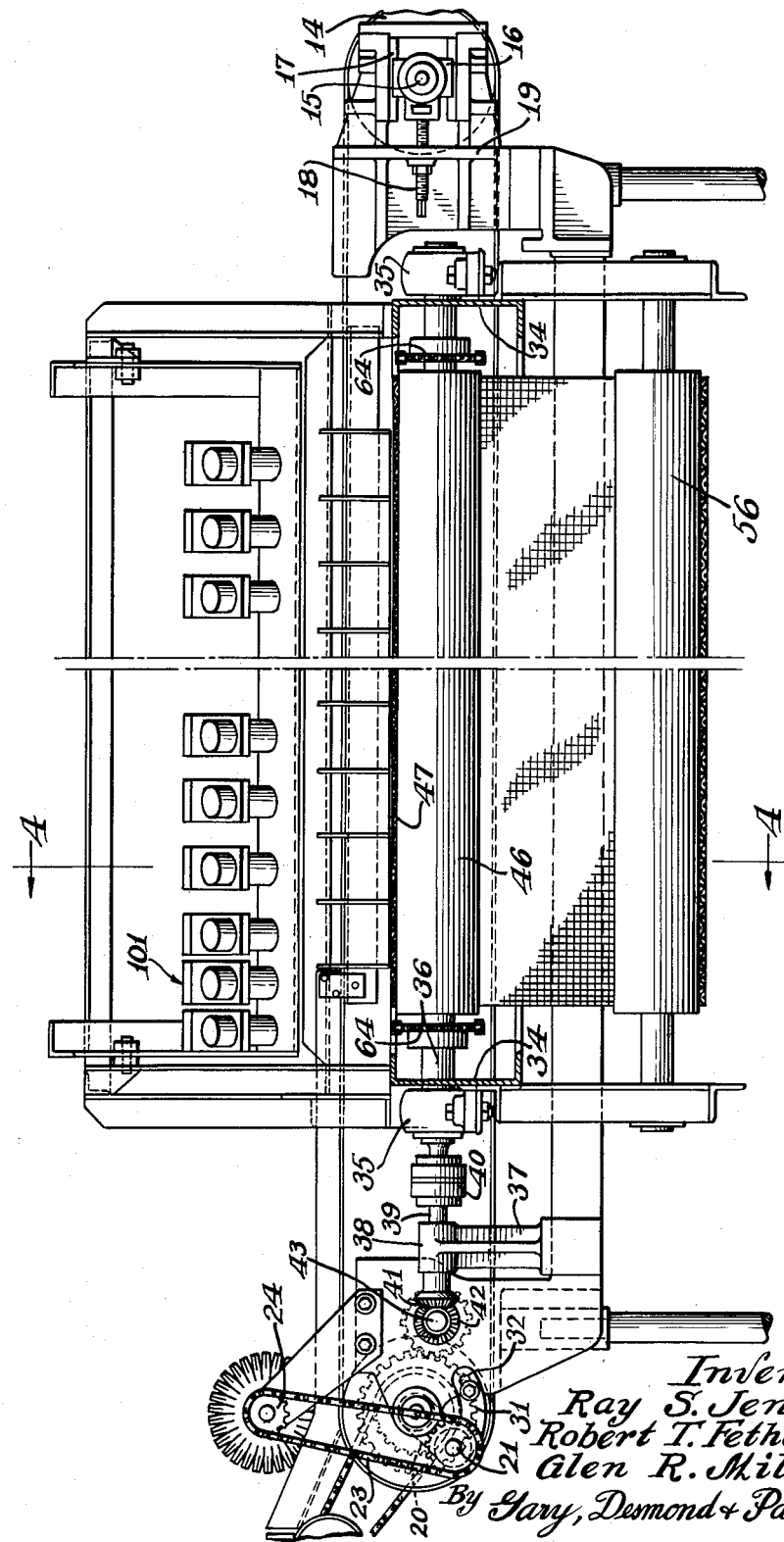

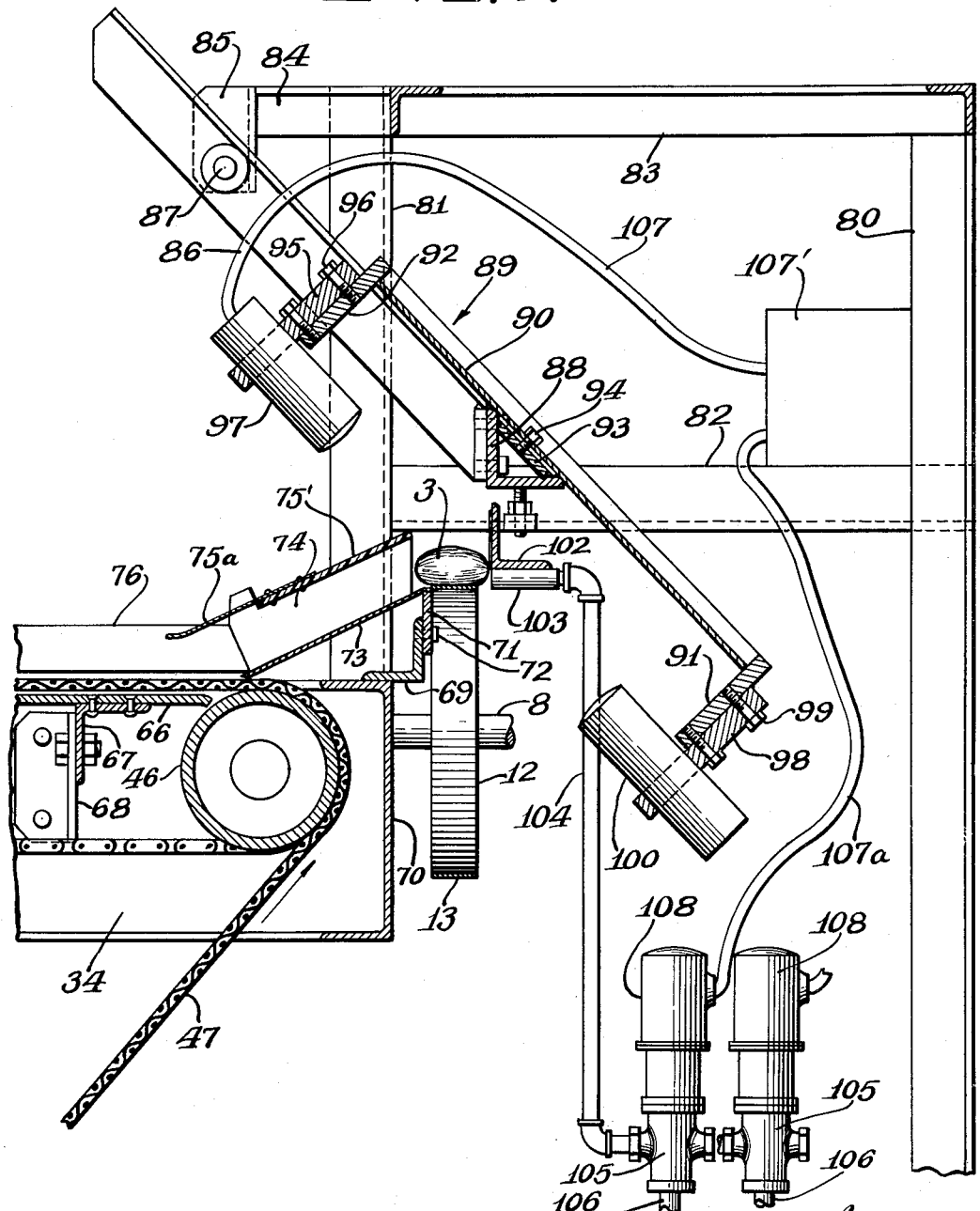

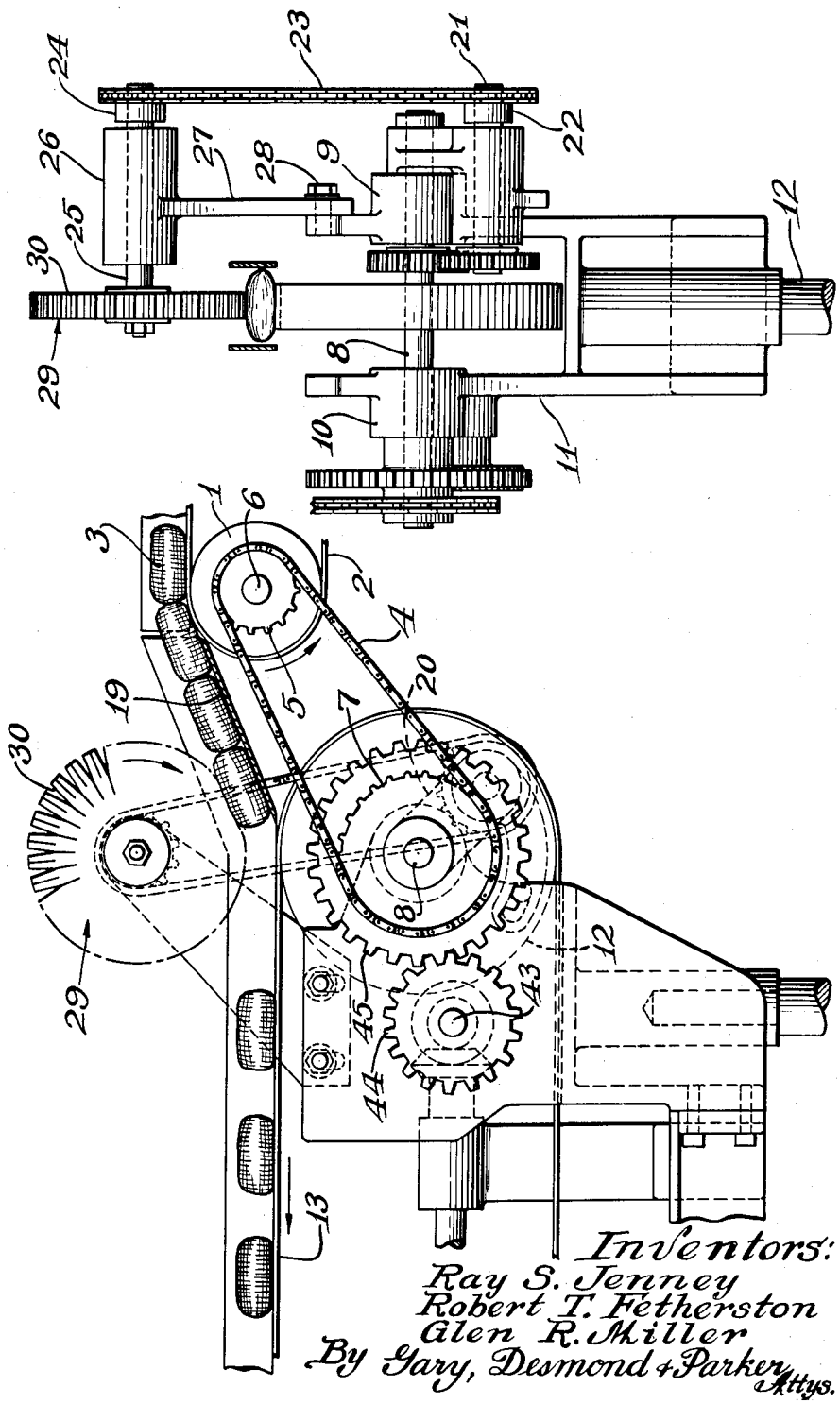

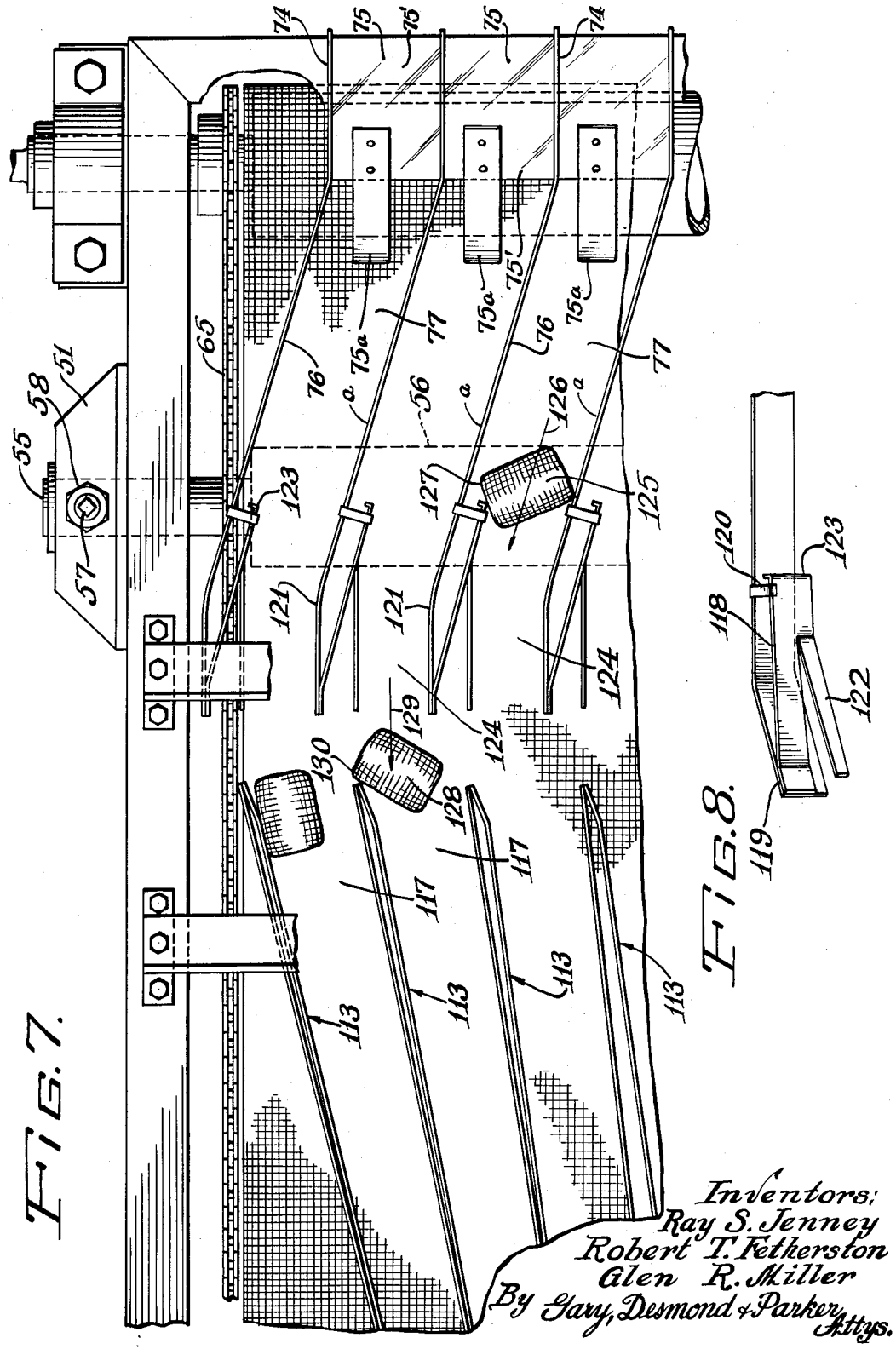

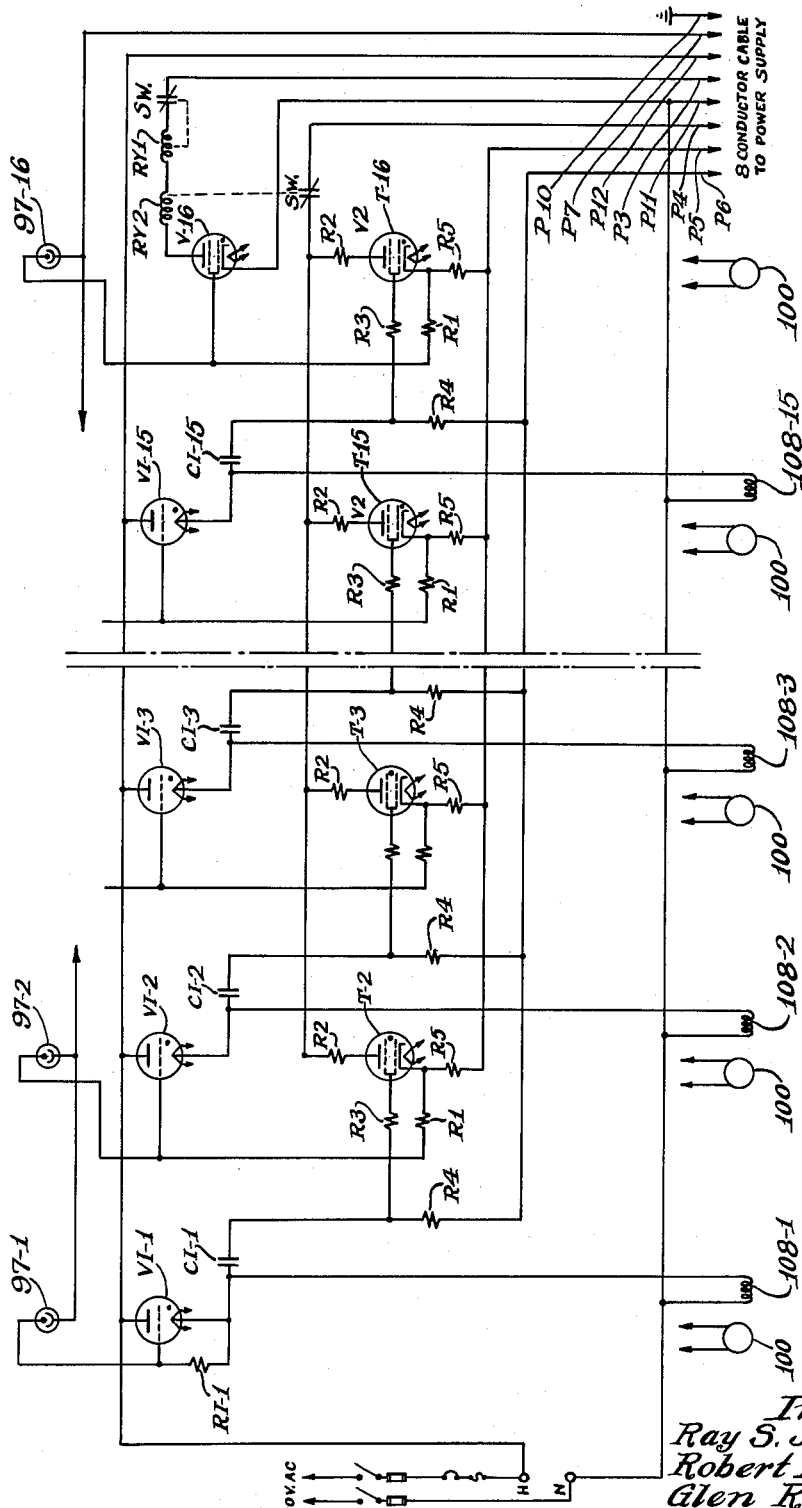

2,744,609
APPARATUS FOR SEPARATING AND FEEDING ARTICLES

Ray S. Jenney, Robert T. Fetherston, and Glen R. Miller, Battle Creek, Mich., assignors to Kellogg Company, Battle Creek, Mich., a corporation of Delaware Application November 4, 1950, Serial No. 194,166

13 Claims. (Cl. 198—31)

This invention relates to improvements in a machine for separating or segregating in a predetermined order articles which may be fed or charged continuously thereto in seriatim.

In the packaging of articles where a plurality of articles are adapted to be disposed in a single package in a predetermined orderly manner it is frequently desirable to feed the articles to such packaging machine in seriatim and package them in multiple units. For example, in one commercial packaging operation, the filled package is to hold five tiers of articles with three articles to a tier, and in packaging the articles, five package forms are loaded simultaneously with a tier of three articles, the package forms intermittently moving after each reception of a tier of articles. It may be convenient to continuously feed articles to such a device in seriatim which requires that the relationship of the movement of the articles be changed, that is the articles previously moving in a series flow are required to be moved in a parallel flow.

The present invention is particularly adapted to perform such an operation, and although it finds particular usefulness in conjunction with a packaging operation, as herebefore described, broadly the present invention can be employed in handling or transporting articles where a similar problem of change of character of relative motion of individual articles is desired.

One of the important features of the present invention resides in a device for sequentially segregating articles which travel to the device in a series flow so that continued movement of the articles takes place in a laterally staggered movement in a direction transverse to their original movement.

To accomplish this end a plurality of "electric eye" trigger mechanisms are contemplated, said mechanisms comprising a plurality of sets of photoelectric cell-light source pairs disposed parallel to the series flow of the articles, each cell, through an appropriate electric circuit, energizing a solenoid-operated air jet whereby the articles are blown from their series conveyor to a transversely moving conveyor when the articles interrupt the light beam associated with an energized photoelectric cell.

Another important feature of the present invention resides in the provision of means for sequentially energizing photoelectric cell-light source pairs in such fashion that a predetermined article is blown by a predetermined jet onto a predetermined portion of a conveyor moving transversely to the direction of travel of the series conveyor.

A further important feature of the present invention resides in means whereby the selective energization of the pairs is repeated when the first pair in line, considered from the direction of movement of the series conveyor, causes its associated jet to discharge. In this fashion a continuous diversion or separation of articles takes place, the cycle being repeated each time a predetermined number of articles, equal to the number of actuatable jets, passes to the device on the series conveyor.

Another important feature of the present invention resides in means for orienting or directionalizing the articles after their diversion or segregation from series flow to parallel flow.

In one commercial packaging operation, the articles packaged are of generally parallelopiped shape, that is, they are in length greater than their thickness or width. In packaging the articles, they are all disposed in the package with their long axes parallel. In diverting such articles from series flow or travel to parallel flow or travel, it frequently happens that the articles become misaligned as they are carried to the packaging machine whereas it is essential when acted on by the packaging machine that they be disposed with their long axes parallel. The present invention contemplates means for orienting those articles in their passage forwardly, after diversion from series travel, whereby they are carried forwardly with their long axes parallel to each other and parallel to their direction of travel.

The present invention is particularly adaptable to the handling of shredded wheat biscuits in their passage to a packaging machine and will be herein described, for purposes of illustration, as handling such articles. However, it is to be understood that the invention is not to be limited to the handling of shredded wheat biscuits, since it will find use in the handling of the other articles and in other environments.

In the drawings:

Fig. 1 is a top plan view of a portion of the machine embodying the concept of the present invention.

Fig. 2 is a side elevational view of that portion of the machine illustrated in Fig. 1, viewed as indicated by the arrow in Fig. 1.

Fig. 3 is a transverse sectional view of the machine, taken on line 3—3 of Fig. 2.

Fig. 4 is a sectional view taken on line 4—4 of Fig. 3.

Fig. 5 is a detailed elevational view of a portion of the charging or series conveyor of the machine.

Fig. 6 is a detailed end elevation of the portion of the machine shown in Fig. 5.

Fig. 7 is an enlarged fragmentary detail plan view of the guide elements employed in orienting biscuits traveling through the machine.

Fig. 8 is a fragmentary detailed perspective of one of the guiding-orienting devices.

Fig. 9 is a schematic wiring diagram of the "electric eye" circuit.

As has been hereinbefore described, the present machine contemplates being used with a preconveyor or series conveyor such as described in application for United States patent of Ray S. Jenney and Robert E. Fetherston, filed September 13, 1950, Serial No. 184,544, wherein articles, such as biscuits are delivered from a toasting oven to a packaging machine, such as the one described in application for United States patent of Ray S. Jenney, filed December 23, 1950, Serial No. 202,517, now Patent No. 2,683,557, granted July 13, 1954. Referring particularly to Figs. 1, 5 and 6 a roll 1 is positioned adjacent the present machine over which a conveyor 2, the series conveyor, continuously travels. The conveyor 2 carries shredded wheat biscuits 3 upon its upper pass, the biscuits 3 being moved by the conveyor in seriatim, one biscuit following the other in the direction of their longitudinal axis. If desired the conveyor comprising the belt 2 may be driven by a sprocket chain 4 trained around sprocket wheel 5 carried upon shaft 6, the same shaft which carries the conveyor roll 1. The sprocket chain 4 may also be trained around sprocket wheel 7 mounted upon the end of shaft 8 which, in turn, may be journaled in bearings 9 and 10 carried by a U-shaped frame member 11. The frame member 11 may be supported by a suitable standard 12 comprising a portion of the frame of the machine.

The shaft 8, if the present machine is used with a packaging machine, may be driven in timed relationship with the mechanism of the packaging machine and hence by the provision of sprocket chain 4 the preconveyor or series conveyor may be driven in timed relationship with the packaging machine.

A drum 12 is also mounted upon shaft 8 between bearings 9 and 10. A conveyor belt 13 may be trained around drum 12 at one end of its travel. The conveyor belt 13 is also trained around drum 14 (Fig. 3), said latter drum being mounted upon shaft 15 journaled in the adjustable bearing block 16, said block being slidably positioned in guides 17 whereby the conveyor belt 13 may be appropriately tightened by the manipulation of screw 18 carried by frame member 19. The conveyor belt 13 preferably comprises a relatively thin resilient metal belt such as a stainless steel belt. The conveyor belt 13 travels in a direction transversely to the length of the machine proper.

A ramp 19 is disposed between roll 1 and drum 12 and functions to support the biscuits 3 delivered from the conveyor belt 2 to the conveyor belt 13. An arm 20 is loosely positioned upon shaft 8, said arm carrying a pin 21 at its end upon which a sprocket wheel 22 is mounted for free rotation. A sprocket chain 23 is trained around sprocket wheel 22 and at the opposite portion of its travel is trained around a sprocket wheel 24 carried by shaft 25 which, in turn, is journaled in bearing 26. The bearing 26 is carried by bracket 27 which is secured to the U-shaped frame 11 by means of screws or the like 28. A roll 29 is carried upon shaft 25, said roll being preferably constructed of relatively soft sponge rubber which may be provided with radial cuts or slits 30 at its periphery to render the periphery thereof extremely soft and yielding.

The roll 29 is positioned above the drum 12 and its periphery is so spaced from said drum that the surface of the roll exerts a relatively mild frictional pressure upon the upper surfaces of the biscuits 3 moving along ramp 19 between conveyor belts 2 and 13. As is well known such biscuits are relatively fragile and, hence, the roll pressure must, of necessity be mild. This is also true with regard to the remaining elements of the machine which handle the biscuits, that is, they are treated gently. In operation, the peripheral speed of roll 29 is the same as the translatory speed of the belt 13 and substantially faster than the translatory speed of belt 2 whereby the biscuits 3 transferred from the ramp 19 to the belt 13 are spaced endwise from each other. The ramp 19 is inclined downwardly from the belt 2 to the belt 13 whereby the biscuits 3 delivered by the belt 2 move by gravity beneath roll 29 whereupon they are transferred to the upper pass of the belt 13.

The arm 20 which carries pin 21 also carries an arcuate extension 31 which is provided, adjacent its end, with a slot 32. An adjusting screw 33 is carried by frame 11, the arrangement being such, that arm 20 may be rotated about shaft 8 to properly tighten the sprocket chain 23 which drives the roll 29.

Referring particularly to Figs. 1, 2 and 3 the machine comprises opposite longitudinal frame members 34—34 extending forwardly from the conveyor belt 13. Bearings 35—35 are carried by opposite frame members 34 and a shaft 36 is journaled in said bearings. A standard 37 is positioned adjacent one end of shaft 36, said standard supporting a bearing 38 in which shaft 39 is journaled. A coupling 40 connects shafts 36 and 39. At the opposite end of shaft 39 a bevel gear 41 is positioned, said gear meshing with a companion bevel gear 42 mounted upon shaft 43. A spur gear 44 is also mounted upon shaft 43 and meshes with a spur gear 45 mounted upon shaft 8. As will be hereinafter more fully described shaft 36 functions to drive shaft 39 which in turn through the mechanism hereinbefore described functions to move conveyor 13.

A roll 46 is carried upon shaft 36 and a relatively wide flexible conveyor 47 is trained around roll 46. The flexible conveyor 47 is also trained around a roll 48 carried upon shaft 49 which, in turn, is journaled in bearings 50 carried at the forward end of beams 34—34.

Angle irons 51—51 are positioned upon each of the beams 34—34, said angle irons supporting opposite guides 52 in each pair of which a bearing block 53 is slidably positioned. At the lower ends of each pair of guides 52 an angle iron 54 is employed as a spacer. A shaft 55 is journaled in the opposite bearing blocks 53 and the flexible conveyor 47 is trained around a roll 56 carried by shaft 55. A screw 57 is operatively positioned in each of the angle irons 51, the ends of said screws being pivotally connected to the bearing blocks 53. Lock nuts 58 are threadedly engaged upon the ends of screws 57 whereby the bearing blocks 53 may be adjustably positioned vertically within guides 52 to adjustably tighten the flexible conveyor 47.

An electric motor 59 is positioned beneath the frame members 34—34 and functions to drive shaft 49. A sprocket wheel 60 is positioned upon the shaft of the motor 59 and a sprocket wheel 61 is positioned upon the end of shaft 49, a sprocket chain 62 being trained around the sprocket wheels 60 and 61. A pair of sprocket wheels 63—63 are carried at opposite ends of shaft 49 and similarly a pair of sprocket wheels 64—64 are carried upon shaft 36. Sprocket chains 65—65 are trained around each pair of sprocket wheels 63—64. In this fashion shafts 49 and 36 are driven shafts whereby the conveyor 47 is merely carried upon the rolls 46 and 48 with no driving stress being exerted by the conveyor.

A plate 66 is positioned beneath the upper pass of the flexible conveyor 47, said plate being supported by angle irons 67 which, in turn, are carried by brackets 68 mounted upon the opposite beams 34. By the provision of plate 66 the flexible conveyor 47 during its upper pass is supported by and slides over said plate.

An angle iron 69 (Figs. 2 and 4) is secured to transverse frame member 70 and extends across the machine substantially coextensive with the roll 46. A plate 71 is secured to the angle iron 69 by means of screws 72 or the like and at the upper edge of the plate 71 a ramp 73 is carried. The upper edge of the plate 71 is substantially flush with the upper pass of the conveyor belt 13 and the ramp 73 is inclined downwardly from the upper edge of said plate to a position immediately above the upper pass of the flexible conveyor 47.

A plurality of parallel partitions 74 are secured to the ramp 73 and divide said ramp into a plurality of passageways 75 (Fig. 7). Each passageway 74 is covered by a cover 75′, each of which carries at its end a relatively resilient blade or leaf spring 75a. A partition plate 76 is secured to each partition 74, said partition plates being positioned immediately above the upper pass of the flexible conveyor 47 and in effect constituting continuations of the partitions 74 whereby a plurality of passageways 77 are provided above the conveyor which, in effect, constitute continuations of the passageways 75.

A pair of supporting blocks 78—78 are positioned upon the upper portions of the opposite frame members or beams 34—34 and an angle iron 79 is secured at its opposite ends to the respective blocks 78. At their forward edge, the partition plates 76 are secured to the lower portion of the angle iron 79 and are supported thereby and maintained in desired spaced relationship with respect to each other.

The partitions 74 upon the ramp 73 are disposed parallel to each other and substantially parallel to the direction of travel of the upper pass of the conveyor 47. The partition plates 76, however, comprising continuations of the partitions 74 are disposed in a diagonal fashion with respect to the direction of travel of the upper pass of the conveyor 47. Adjacent the angle iron 79 the partition plates 76 are bent to extend for a relatively short distance parallel to the direction of travel of the screen conveyor 47. The purpose of this arrangement will be hereinafter more fully described.

A frame structure comprising upright frame members 80 and 81 embraced by cross members 82 and 83 is positioned adjacent the charging end of the machine, the frame members extending above the upper pass of the conveyor belt 13. The frame members 83 extend beyond the upright frame members 81 respectively on each side of the machine to provide supporting arms 84. Brackets 85 are mounted upon the arms 84 and are adapted to be secured to angle irons 86. A bolt 87 passes through each of the angle irons 86 and secures each such angle iron to a bracket 85, the arrangement being such that the angle irons 86 are adjustable to a desired angularly inclined position with respect to the brackets 85.

At the lower ends of the opposite angle irons 86 a transverse angle member 88 is secured, the transverse angle member 88 being adapted to support a plurality of spaced "electric eye" assemblies 89.

Each electric eye assembly 89 comprises a channel member 90 having end flanges 91 and 92. Each channel member 90 is secured to a diagonally positioned plate 93 which may be secured to the angle member 89, preferably by welding. A screw 94 functions to secure the channel members 90 to the plates 93. The end flange 92 carried by each channel member 90 carries a bracket 95 which is secured to the flange 92 by screws 96, the bracket 95 in turn supporting a photoelectric cell 97. Each end flange 91 carried by each channel member 90 carries a bracket 98 which is secured to each flange 91 by screws 99. A light housing 100 is carried by each of the brackets 98.

There are the same number of electric eye assemblies 89 as there are passageways 75 plus one additional assembly 101 (Fig. 3), the function of which will be hereinafter more fully described. The assembly 101 is identical with the assemblies 89 but is used for a different purpose. The arrangement is such that each illuminating device 100 casts a beam toward the active portion of each corresponding photoelectric cell 97 and the assemblies are so oriented with respect to the conveyor 13 that a biscuit 3 carried upon the surface of said conveyor will intercept the beam projected from the illuminating devices 100 when the biscuit is carried forwardly upon the conveyor.

An angle iron 102 is disposed transversely across the machine and is positioned adjacent the path of travel of the upper pass of the conveyor 13. Beneath the lower leg of the angle iron 102 a plurality of air nozzles 103 are carried, the opening of the nozzles being directed immediately above the upper pass of the conveyor 13 in such a manner that when air is discharged from the nozzles it will be projected upon a biscuit 3 carried upon the conveyor 13. A pipe 104 connects with each air nozzle 103, said pipe connecting at its opposite end into a control valve 105. Each control valve 105 connects with an inlet pipe 106 the opposite end of which is connected to a source of fluid under pressure preferably air (not shown).

There are as many air nozzles 103 as there are electric eye assemblies 89 and each air nozzle is positioned in the same vertical plane with the beam projected from the illuminating devices 100 toward the photoelectric cells 97. As has been hereinbefore described the number of electric eye assemblies 89 is equal to the number of passageways 75. Similarly the number of air nozzles 103 is equal to the number of passageways 75 and said air nozzles together with the electric eye assemblies are positioned in alignment with the central portions of the passageways 75.

Each photoelectric cell 97 is connected by means of conductors 107 to an electronic trigger mechanism 107' shown diagrammatically in Fig. 4 and shown schematically in Fig. 9. The trigger mechanism in turn connects with each solenoid 108 by conductors 107a to a solenoid 108 which is mounted upon each valve 105, the arrangement being such that actuation of the solenoids function to open the respective valve associated with the actuated solenoid. As will be hereinafter more fully described an electrical circuit is so devised that as biscuits are carried forwardly on the conveyor 13 the first biscuit in line traverses substantially the entire width of the machine, intercepting the various light beams of the electric eye assemblies 89. The arrangement is such that the only photoelectric cell 97 actuated at the initial period of operation is the one most remote from the entrance of the biscuits to the conveyor belt 13. The first biscuit, therefore, intercepts the various light beams but does not function to actuate any of the solenoids 108 until the last beam in the line of electric eye assemblies 89 is intercepted. At this period the photoelectric cell 97 of the last electric eye assembly functions to actuate the solenoid 108 associated therewith and the respective valve 105 is opened to permit a blast of air to issue from the respective nozzle 103. The blast of air is of sufficient intensity to blow the biscuit 3 transversely from the conveyor belt 13. In this fashion the biscuit is blown into the last passageway 75. By the provision of the cover 75' and spring leaf 75a the biscuit is prevented from being blown out of the passageway 75.

The electric circuit, hereinafter more fully described, then functions to actuate the next adjacent electric eye assembly so that when the next biscuit in series traveling upon the conveyor 13 intercepts the beam of the actuated electric eye assembly it is similarly blown into the next adjacent passageway 75. This operation is continued until a biscuit has been blown into each of the passageways 75. The electric circuit is so devised that when the electric eye assembly for blowing a biscuit into the last passageway, that is, the first passageway closest to the entrance of the biscuits has been actuated, the next biscuit in line intercepts the beam of the electric eye assembly 101 which at that period is actuated. By so intercepting the beam of this assembly, all of the remaining electric eye assemblies are deactuated except the last one in line. Consequently the biscuit which has "triggered" the electric eye assembly 101 continues its passage upon the conveyor 13 until the beam of the last electric eye assembly is intercepted at which time the operation is repeated.

Referring particularly to Figs. 1 and 2, an angle iron 109 is transversely disposed across the machine, being supported by opposite blocks 110 carried upon the upper portions of the opposite beams 34. The transversely disposed angle iron 109 is spaced from the angle iron 79 which supports the partition plates 76. Spaced from the angle iron 109 in the direction of travel of the screen conveyor 47 is a second angle iron 111 which transversely spans the machine and is supported at its opposite ends by blocks 112 which, in turn, are carried upon the upper portions of the beams 34—34. The angle iron 111 is disposed substantially at the termination of the forward pass of the conveyor 47.

It will be noted that both transverse angle irons 109 and 111 are positioned above the path of travel of the upper pass of the conveyor 47, said angle irons being adapted to support a plurality of partitions 113, the partitions being disposed substantially vertically and suspended from the angle irons 109 and 111. The partitions 113 are of three forms. The outer partitions 113, designated 114, are of single ply construction, both outer partitions converging inwardly toward the center of the machine in the direction of travel of the conveyor 47. Another form of partition comprises the group of partitions indicated by the numeral 115 which is of double ply construction throughout its entire length, the plies being spaced from each other throughout the length of the partitions. The third form of partition 113 is designated by the numeral 116 and comprises double ply construction for a portion of their length and single ply construction for the remaining portion of their length.

It will be noted (Fig. 1) that included between adjacent double ply partitions 115 are two spaced partitions 116 and included between the outer single partitions 114 and the adjacent double partitions 115 two spaced partitions 116 are included. The arrangement is such that a plurality of adjacent passageways 117 are provided above the surface of the conveyor 47, the passageways 117 being grouped in threes, the double partitions 115 dividing each group of three passageways from the next group of three passageways.

If the present machine is to be used with a packaging machine which may pack five tiers of biscuits three to a tier within a carton the passageways 117 will be grouped in five groups of three each. In effect, the number of groups of passageways correspond to the number of tiers to be inserted in the box and the number of passageways in a group correspond to the number of biscuits constituting each tier.

As has been hereinbefore described the biscuits carried upon the conveyor 13 are displaced from the upper pass of said conveyor by blasts from the air nozzles 103. The biscuits thus displaced are blown into the passageways 75. The biscuits thereupon slide downwardly upon the ramp 73 and are carried forwardly by the conveyor 47. It will be noted that the partition plates 76 are inclined with respect to the direction of travel of the conveyor 47. Hence, as the biscuits are carried forwardly by the conveyor they are caused to move into contact with that side of each partition 76 which is approached by the forwardly moving conveyor. For example, with specific reference to Fig. 7, the biscuits will contact those sides of the partition plates 76 designated by the letter $a$.

Although the biscuits carried upon the upper surface of the conveyor 13 are carried in the direction of their longitudinal axes, when said biscuits are blown from the conveyor into the passageways 75 the biscuits will orient themselves in a more or less haphazard manner, however, always resting on a surface of largest dimension, that is, resting flatwise on the screen conveyor. It is desirable, however, that in the actual packaging of the biscuits, the biscuits be delivered to the packaging stations in the direction of their longitudinal axes. Therefore, means, hereinafter described, is contemplated for orienting the biscuits after their haphazard initial disposition into the passageways 75 and 77.

Referring particularly to Figs. 7 and 8, a resilient plate 118 is carried adjacent the end of each partition plate 76, said plate at one end being secured to the end of the partition plate as at 119, preferably by welding, and the opposite end being spaced from the respective partition plate 76 by the spacer clamp 120. The ends of each plate 118 adjacent the clamp 120 is not secured to said clamp, but is free to move inwardly toward the partition 76 upon which its opposite end is mounted. Each plate 118 thereby normally assumes a bridging position with respect to corners 121 where the partition plates are bent from their inclined position to a parallel position with respect to the direction of travel of the conveyor 47. A resilient tongue 122 is struck up from each plate 118 and extends inwardly into each passageway 77, the tongues 122 in effect being resilient cantilevers.

The ends of the partition plates 76 are spaced from the ends of the partitions 113 in the direction of travel of the conveyor 47. The ends of said partition plates and partitions are additionally offset laterally with respect to each other so that the transverse distance from the active face $a$ of partition plate 76 to the leading corner of partition 113 is less than the longitudinal, but greater than the transverse dimension of the biscuit. The "at rest" or normal position of each resilient plate 118 and resilient tongue 122 is such that no contact with the biscuit is made by either of these elements if the biscuit is disposed with its longitudinal dimension parallel to partition plate 76.

The arrangement is such that a biscuit 3 which may move through a predetermined passageway 77 arrives adjacent the end 123 of plate 118 in one of three positions, as follows:

A. With its longitudinal dimension parallel to plate 76, in which case the biscuit is more or less stable with regard to any tendency to rotate about a vertical axis, and hence it proceeds along plate 76 to passageway 117 without contacting plate 118 or tongue 122 or without being interfered with or turned in any fashion.

B. With its end disposed in contact with the active face $a$ of partition plate 76, in which case its opposite end contacts the side or face of the resilient plate 118 but not the end 123 of said plate, said end being turned away slightly from the opposite plate 76. Thereafter the end to end contact with plate 76 and plate 118 and tongue 122 functions to substantially perfectly align or maintain the alignment of the biscuit 3 with its longitudinal axis at right angles to the travel of the conveyor 47. The result of this positioning is illustrated in Fig. 7 by biscuit 128. As the biscuit moves forwardly from the end of plate 76, the corner 130 of biscuit 128 contacts the corner of the partition 113, thus rotating the biscuit 128 in a clockwise direction and aligning its longitudinal axis parallel with partition 113.

C. In counterclockwise rotation from the position referred to in B above. If the biscuit initially deposited upon conveyor 47 assumes a position such as described in B above, it is more or less unstable relative to rotation about a vertical axis is concerned, since by virtue of the inclination of the partition plates 76 the biscuit tends to slide along the face $a$ of the partition plate and to this extent this end of the biscuit is retarded relative to its opposite end. A force couple is thereby exerted upon the biscuit which is a function of the distance of its free end from the end contacting the partition plate 76. This distance being greater when the biscuit is in end contact with the partition plate than when it is in side contact therewith subjects the biscuit to a rotational force in the former case which may be effective to rotate the biscuit in a counterclockwise direction, as viewed in Fig. 7, which is not effective to rotate the biscuit in the latter case. Hence, the biscuit in many instances tends to assume the position illustrated at 125 in Fig. 7. In this case the end portion 127 of the biscuit 125 makes contact with the end 123 of plate 118. Forward progress of this end portion is thus temporarily arrested. Continued motion of the biscuit along line 126 induces a clockwise rotation to align the biscuit 125 with its longitudinal axis at substantially right angles to the partition plate 76. This position is identical with the position described in B above and subsequent progress is identical thereto.

Action of the partition plates 76 as the biscuits are conveyed by conveyor 47 serves to align the longitudinal dimension of the biscuit either parallel to or at right angles to the partition plate 76. If aligned with the longitudinal dimension at right angles to partition plate 76 the biscuit is in a somewhat unstable position and may or may not start a counterclockwise rotation which if continued aligns its longitudinal dimension parallel to plate 76. The counter-clockwise rotation cannot continue beyond that portion of plate 76 which is inclined to the direction of travel of conveyor 47. Since the starting time of this rotation is uncertain, the resilient plates 118 are employed. If the counterclockwise rotation of the biscuit has proceeded sufficiently far so that the biscuit corner farthest from partition plate 76 does not contact plate 118, orientation takes place naturally and without interference. If contact is made with plate 118, orientation then take place to dispose the biscuit with its longitudinal dimension at right angles to partition plate 76, and final alignment occurs only after the corner of the biscuit contacts partition 113 as indicated by biscuit 128 on Fig. 7. It is therefore the lateral displacement of partitions 113 with respect to partitions 76 which is important in the final orientation of biscuits which have been operated on by plate 118.

It will be noted that the passageways 117 converge in group fashion toward the center of the machine. Consequently, the partitions 113 are appropriately inclined to the direction of travel of the conveyor 47 so as to cause said passageways to converge.

Fig. 9 shows a schematic wiring diagram of the electrical circuit associated with the various electric eye assemblies employed herein. In the description of this circuit, the following potential values apply with reference to the terminals of the power supply cables illustrated in Fig. 9. Terminals P11 and P12 are alternating current supply wires to a conventional power pack (not shown), junction P11 being the neutral wire. This point is tied to an intermediate point on the voltage divider of the power pack. With reference to terminal P11, terminals P5 and P6 and P7 may be considered negative, increasing negatively in that order; and terminals P4 and P3 may be considered positive, increasing positively in that order.

At the beginning of the cycle of operation tube V1–1 has its grid connected to terminal P7 through the photo-electric cell 97—1. Hence, by virtue of the voltage drop across R1–1, the grid is negative with respect to the cathode of tube V1–1, since light 100 is projected upon cell 97—1 and said cell is conducting. However, as the first biscuit upon conveyor 13 moves through and intercepts the various light beams, none of the jets 103 is actuated, as will be hereinafter more fully described, until the biscuit intercepts the beam from the respective light 100 to photo-electric cell 97—1, that is, the electric eye unit last in line. When this beam is intercepted, the cell 97—1 becomes non-conducting; current ceases to flow through resistor R1–1, thus reducing the grid bias of the tube V1–1 and permitting a pulsating or half-wave rectified current to flow in the anode cathode circuit of said tube. During this "flow," the grid of this tube can regain control during the dead half cycle whenever the impingement of light on cell 97—1 produces the current flow and potential difference across R1–1 necessary to prevent current flow through the tube V1–1. Solenoid 108—1 is connected in this anode cathode circuit; and hence valve 105 associated with said solenoid is opened and air is discharged from jet 103, thereby discharging the biscuit into the endmost passageway 75.

An electron tube T–2 is associated with tube V1–2, the cathode of tube T–2 being connected to the grid of tube V1–2 through a resistor R1. The cathode of tube T–2 is connected to terminal P5 through resistor R5. The anode of tube T–2 is connected to terminal P4 through resistor R2. It will be noted that the cathode of tube V1–1 is connected through capacitor C1–1 and through resistor R3 to the grid of the tube T2. Hence, tube T–2, normally non-conducting, has its grid rendered insufficiently negative with respect to its cathode to prevent current flow in tube T–2, whenever current flows in the anode cathode circuit of tube V1–1. During the first pulsation of current flow in the anode cathode circuit of tube V1–1, the grid bias of tube T–2 is reduced by virtue of, capacitance C1–1 and voltage drop across solenoid 108—1 and current flow is established in the anode cathode circuit of tube T–2. Prior to the establishment of this current flow, the grid of V1–2, by virtue of voltage drop across R1 and R5, has been held at a sufficiently negative value to prevent current flow in tube V1–2 regardless of the light condition of cell 97—2. After this flow in tube T–2 is established, the grid of V1–2, by virtue of R1 and the less negative potential at junction of R1 and R5 due to the reversal of flow through R5, is maintained at only a sufficiently negative value so that no flow is established so long as light impinges on cell 97—2. Whenever the second biscuit interrupts the light 100 associated with cell 97—2, the absence of current flow and therefore of potential drop across resistor R1 further reduces the negative potential on the grid of tube V1–2 which then flows current in a manner identical with tube V1–1, thus energizing solenoid 108—2 to operate valve 105 by which air is discharged from jet 103 to discharge the biscuit into the next passageway 75.

The tube V1–2 is similarly associated with the next interlocking tube T–3 and so on throughout all the electric eye assemblies 89. Hence, as the biscuits sequentially move on conveyor 13, they sequentially intercept light beams which are associated with progressively actuated photo-electric cell tube circuits.

When the fifteenth biscuit in line intercepts its corresponding beam, the tube T–16 is rendered conductive. Hence, when the sixteenth biscuit intercepts the beam of light associated with cell 97—16, the tube V–16 is rendered conductive, and current passes through its anode cathode circuit. Included in this circuit is a relay RY–2 which functions to open switch SW in the anode circuit of all tubes of group T. The tubes T are thereby rendered non-conductive, thereby rendering tubes V1–2 to V1–15 inclusive non-responsive to interruptions of their associated light beams. Tube V1–1 then remains as the only responsive tube of the V1 group. In order to render the tube V–16 non-conductive, relay RY–1 and its associated switch SW–1 are also included in the anode-cathode circuit of tube V–16. Relay RY–1 is a delayed relay. The delay operates to maintain current flow in the anode cathode circuit of V–16 which maintains SW in the open position for a sufficient length of time to permit de-ionization of the gas in all of the T tubes. At the end of this delay, RY–1 functions to open SW–1, thus preventing current flow through tube V–16, thus de-energizing both RY–2 and RY–1 to restore connections SW and SW–1. The entire apparatus is then in readiness to repeat the cycle.

The position of the biscuit which, by intercepting the light to cell 97—16, actuated tube V–16 remains undisturbed on conveyor 13 and this biscuit becomes the first biscuit of the following cycle.

In the event that the device comprising the present invention is employed with and dependent upon the operation of another or other machines, such, for instance, as a packaging machine, it is possible that interruption in the operation of the cooperating machine may leave, in effect, at least temporarily, no outlet for the segregated and delivered products of the present machine. In this case the articles delivered to the passageways 117 would accumulate in said passageways and the machine would be rendered inoperative.

In order to prevent such an occurrence, means is contemplated for rendering all of the electric eye assemblies inoperative whereby articles carried upon the belt 13 will pass undisturbed across the entire machine and be discharged at the end of the belt to any suitable receptacle (not shown).

To accomplish this end a transverse member 131 may be supported at its opposite ends upon the opposite frame members 34. The transverse member 131 carries a plurality of spaced micro-switches 132, each of which is provided with a resilient feeler arm 133 which extends into a predetermined passageway 117. Each of the micro-switches is normally closed and said switches are all connected in series, the series circuit being connected to a suitable timer, preferably a conventional electronic timer (not shown). The timer, in turn, is connected to the electronic-electric eye circuit illustrated in Fig. 9.

The arrangement is such that during the normal operation of the machine, the articles traveling through the passageways 117 associated with the micro-switches function to raise the respective feeler arms 133 which momentarily opens the series circuit. However, the timer is so adjusted that it will not respond to a momentary opening of the series circuit to shut off the electric-eye circuit. In handling predetermined products, such as, shredded wheat biscuits it has been found that a time delay of about five seconds between opening of the series circuit and shutting off of the electric-eye circuit is satisfactory. Of course, any minimum time delay may be employed depending upon the articles handled and the intended use of the machine.

If, however, the articles being to accumulate in the passageways at least one of the micro-switches will be opened and held open for a period of time greater than the set time delay. When this occurs, the timer renders the electric-eye circuit inoperative and no more articles are delivered to the passageways 117 from belt 13. When the accumulation of articles in the passageways is relieved and the micro-switches again close, completing the series circuit, the timer functions to again render the electric-eye circuit operative.

In the illustrated embodiment of the present invention fifteen passageways 117 are shown and five micro-switches 132 are employed, one for each three passageways. This specific arrangement is particularly suitable where a packaging machine which handles articles in units of threes is employed with the present device since if a blockage occurs in the passageways 117, three passageways will be blocked at the same time thereby actuating one of the micro-switches. If, however, the use of the device is such that there is a possibility of only one passageway being blocked, a separate micro-switch 132 may be employed in association with each passageway.

In the event that the articles being segregated and delivered become jammed at some portion of the machine between the entrance thereto and the vicinity of the micro-switches 132, provision is made for diverting the further feed of articles upon belt 13. To accomplish this end an electric-eye assembly 134 (Fig. 1) comprising a light source 135 and photoelectric cell 136 is disposed adjacent to, and in advance of, the electric-eye assemblies hereinbefore described. The photoelectric cell 136 is connected through a conventional timer, perferably a conventional electronic timer (not shown) to a solenoid 137 mounted upon a bracket 138, which, in turn, is supported by the frame of the machine. The solenoid 137 carries a movable plunger 138 which is pivotally connected to a diverter arm 139 which is pivotally swingable to the dotted line position shown in Fig. 1 when the solenoid 137 is energized.

The arrangement is such that the light source 135 directs a beam of light to the photo-cell 136, the beam traversing the path of travel of the articles upon belt 13. The timer is so set that interruption of the light beam by the normal passage of the articles does not result in energization of the solenoid 137, but if the light beam is interrupted for a predetermined period of time, as determined by the adjustment of the timer, as when an article dwells in beam-interrupting position for said predetermined period of time, the photoelectric cell 136 will function to energize the solenoid 137 to swing the diverting arm 139 to the dotted line position. Thereafter, all articles moving up to the machine upon the belt 13 will be diverted from the belt and may be delivered to a suitable receptacle (not shown). In this fashion no further articles will be delivered to the machine until the jam is cleared at which time the diverter arm may be manually reset to normal or full-line position.

As has been hereinbefore described, the present machine is particularly adaptable as an adjunct to a packaging machine, but it will be obvious to any one skilled in the art that it may be employed in other environments. Hence, it is not intended that the invention be limited to any specific use nor to the handling, segregating or delivering of any specific article except as contemplated in the attached claims.

We claim as our invention:

1. A machine for changing series movement of articles to substantially parallel transverse movement thereof which comprises, a series conveyor for continuously carrying a plurality of spaced articles in seriatim, a continuously moving transverse conveyor disposed adjacent and moving transversely to said series conveyor, means disposed adjacent the upper pass of said series conveyor for displacing articles from the series conveyor as they move adjacent the transverse conveyor, said means comprising air jets disposed in spaced relationship parallel to said series conveyor, and directed in the same direction transversely to the series conveyor and substantially parallel to the transverse conveyor, and separate means disposed adjacent each air jet for actuating the adjacent air jet, and detecting means for each actuating means for energizing said actuating means in response to the passage of articles on said series conveyor adjacent said transverse conveyor to displace said articles from said series conveyor to said transverse conveyor.

2. A machine for changing series movement of articles to substantially parallel transverse movement thereof which comprises, a series conveyor for continuously carrying a plurality of spaced articles in seriatim on its upper pass, a continuously moving transverse conveyor disposed adjacent and moving transversely to said series conveyor, the upper pass of the transverse conveyor being below the upper pass of the series conveyor, air jets disposed in a row in spaced relationship adjacent the upper pass of said series conveyor for displacing articles from the series conveyor onto said transverse conveyor as they move adjacent the transverse conveyor, and light sensitive means responsive to the passage of articles on said series conveyor for progressively and repetitively actuating the air jets to displace said articles from said series conveyor and dispose the articles on the transverse conveyor in spaced lateral relationship.

3. A machine for changing series movement of articles to substantially parallel transverse movement thereof which comprises, a series conveyor for continuously carrying a plurality of articles spaced in seriatim, a continuously moving transverse conveyor disposed adjacent and moving transversely to said series conveyor, means disposed adjacent the upper pass of said series conveyor for displacing articles from the series conveyor onto the transverse conveyor as they move adjacent the transverse conveyor, and means for progressively actuating the projecting means in timed relationship with the passage of articles on said series conveyor adjacent said transverse conveyor, said last-mentioned means comprising a plurality of pairs of light beams and photoelectric cells disposed parallel to the series conveyor, the light beams traversing the paths of the articles on the series conveyor and the displacing means being actuated in response to interruption of the light beams to the associated cells.

4. A machine for changing series movement of articles to substantially parallel transverse movement thereof which comprises, a series conveyor for continuously carrying a plurality of articles spaced in seriatim, a continuously moving transverse conveyor disposed adjacent and moving transversely to said series conveyor, a plurality of air jets disposed adjacent the upper pass of said series conveyor for displacing articles from the series conveyor onto the transverse conveyor as they move adjacent the transverse conveyor, a solenoid operated valve for controlling the passage of air under pressure to each air jet, and light-sensitive means for opening the solenoid valves in timed relationship with the passage of articles on said series conveyor adjacent said transverse conveyor.

5. A machine for changing series movement of articles to substantially parallel transverse movement thereof which comprises, a series conveyor for continuously carrying a plurality of articles spaced in seriatim, a continuously moving transverse conveyor disposed adjacent and moving transversely to said series conveyor, a plurality of air jets disposed adjacent the upper pass of said series conveyor for displacing articles from the series conveyor onto the transverse conveyor as they move adjacent the transverse conveyor, a solenoid operated valve for controlling the passage of air under pressure to each air jet, and means for progressively opening the solenoid valves in timed relationship with the passage of articles on said series conveyor adjacent said transverse conveyor, said last-mentioned means comprising a plurality of pairs of light beams and light-sensitive cells disposed parallel to the series conveyor, the light beams traversing the paths of the articles on the series conveyor, an electric circuit connecting the light-sensitive cells and the solenoids whereby interruption of a light beam to a cell actuates a solenoid causing a displacement of an article from the series conveyor.

6. A machine for changing series movement of articles to substantially parallel transverse movement thereof which comprises, a series conveyor for continuously carrying a plurality of articles in spaced seriatim relationship, a continuously moving transverse conveyor disposed adjacent, and moving transverse to said series conveyor, spaced members positioned above, generally parallel and adjacent to, the upperpass of said transverse conveyor to define a plurality of laterally adjacent passageways, a plurality of air jets disposed adjacent the upper pass of said series conveyor for displacing articles from said series conveyor onto said transverse conveyor as they move adjacent the passageways of said transverse conveyor, a solenoid operated valve for controlling the passage of air under pressure to each jet, and means for progressively opening said solenoid valves in timed relationship with passage of articles on said series conveyor adjacent said passageways, said last-mentioned means comprising a plurality of pairs of light beams and light-sensitive cells disposed parallel to the series conveyor, the light beams in passing to the light cells traversing the paths of travel of the articles on the series conveyor, an electric circuit connecting the light-sensitive cells and the solenoids whereby interruption of a light beam to a cell actuates a solenoid causing a displacement of an article from the series conveyor.

7. A machine for changing series movement of articles to substantially parallel transverse movement thereof which comprises, a series conveyor for continuously carrying a plurality of articles in spaced seriatim relationship, a continuously moving transverse conveyor disposed adjacent and moving transverse to said series conveyor, laterally spaced members defining a plurality of laterally adjacent passageways above the transverse conveyor, a plurality of displacing devices disposed in parallel relationship to the series conveyor and being spaced from each other, each displacing device being in substantial alignment with a passageway, electrical means for actuating said displacing means to project articles from the series conveyor to said passageways, actuated photoelectric means disposed adjacent the series conveyor and connected to each electrical means, said photoelectric means being deactuated by the passage of articles upon the series conveyor, said connection comprising an electric circuit including electronic tubes for progressively energizing said electrical means in response to progressively deactuated photoelectric means.

8. A machine for changing series movement of articles to substantially parallel transverse movement thereof which comprises, a series conveyor for continuously carrying a plurality of articles in spaced seriatim relationship, a continuously moving transverse conveyor disposed adjacent and moving transverse to said series conveyor, laterally spaced members defining a plurality of laterally adjacent passageways above the transverse conveyor, a plurality of fluid pressure jets disposed in parallel relationship to the series conveyor and being spaced from each other, each jet being in substantial alignment with a passageway for blowing articles from the series conveyor to said passageways, a solenoid operated valve for controlling passage of fluid under pressure to each jet, a plurality of pairs of cooperating light beams and photoelectric cells one pair being disposed adjacent each jet with its light beam traversing the path of travel of the articles upon the series conveyor, said photoelectric cells being deactuated by passage of articles through its associated beam, an electric circuit including electronic tubes connecting said photoelectric cells and said solenoids for progressively energizing said solenoids in response to progressive deactuation of the photoelectric cells.

9. A machine for changing series movement of articles to substantially parallel transverse movement thereof which comprises, a series conveyor for continuously carrying a plurality of articles in spaced seriatim relationship, a continuously moving transverse conveyor disposed adjacent and moving transverse to said series conveyor, laterally spaced members defining a plurality of laterally adjacent passageways above the transverse conveyor, means for transversely moving articles from said series conveyor to the passageways, and means disposed adjacent said passageways for rendering said moving means inoperative when said passageways carry a predetermined number of articles.

10. A machine for changing series movement of articles to substantially parallel transverse movement thereof which comprises, a series conveyor for continuously carrying a plurality of articles in spaced seriatim relationship, a continuously moving transverse conveyor disposed adjacent and moving transverse to said series conveyor, laterally spaced members defining a plurality of laterally adjacent passageways above the transverse conveyor, electrically operated means for transversely projecting articles from the series conveyor to the passageways, and switch means disposed adjacent said passageways for rendering said electrically operated means inoperative when said passageways carry a predetermined number of articles.

11. In a machine for changing series movement of articles to substantially parallel transverse movement thereof which comprises, a series conveyor for continuously carrying a plurality of spaced articles in seriatim, a continuously moving transverse conveyor disposed adjacent and moving transversely to said series conveyor, a plurality of means disposed adjacent the upper pass of said series conveyor for displacing a plurality of articles from the series conveyor in the same direction onto the transverse conveyor as they move adjacent the transverse conveyor, said displacing means comprising a plurality of air jets disposed in series spaced relationship parallel to said series conveyor, and separate means for actuating each air jet in response to movement of predetermined articles in said seriatim disposition adjacent predetermined air jets to displace said articles from said series conveyor to said transverse conveyor.

12. In a machine for changing series movement of groups of articles to substantially parallel transverse movement thereof which comprises, a series conveyor for continuously carrying groups of articles each group comprising a plurality of spaced articles disposed in a row, a continuously moving transverse conveyor disposed adjacent and moving transversely to said series conveyor, a plurality of means equal in number to the number of articles in each group disposed in a row adjacent and parallel to the upper pass of said series conveyor for displacing articles from the series conveyor in the same direction onto the transverse conveyor as they move adjacent the transverse conveyor, and separate means for actuating each displacing means as a predetermined article of each group moves adjacent a predetermined displacing means.

13. In a machine for changing series movement of groups of articles to substantially parallel transverse movement thereof which comprises, a series conveyor for continuously carrying groups of articles each group comprising a plurality of spaced articles disposed in a row, a continuously moving transverse conveyor disposed adjacent and moving transversely to said series conveyor, a plurality of means equal in number to the number of articles in each group disposed in a row adjacent and parallel to the upper pass of said series conveyor for displacing articles from the series conveyor in the same direction onto the transverse conveyor as they move adjacent the transverse conveyor, separate means for actuating each displacing means as a predetermined article of each group moves adjacent a predetermined displacing means, an means for rendering said actuating means inoperative until said predetermined article of each group moves adjacent said corresponding predetermined displacing means.

References Cited in the file of this patent

UNITED STATES PATENTS

| | | | |
|---|---|---|---|
| Re. 20,876 | Molins | Oct. 4, | 1938 |
| 1,319,190 | Houten | Oct. 21, | 1919 |
| 1,528,227 | Spooner | Mar. 3, | 1925 |
| 2,192,518 | Eissmann | Mar. 5, | 1940 |
| 2,205,106 | Paterson | June 18, | 1940 |
| 2,508,086 | Alvarez | May 16, | 1950 |
| 2,534,954 | Dalton | Dec. 19, | 1950 |

FOREIGN PATENTS

| | | | |
|---|---|---|---|
| 611,794 | Germany | Apr. 6, | 1935 |
| 359,196 | Italy | May 16, | 1938 |